United States Patent [19]
Odoi et al.

[11] Patent Number: 5,372,401
[45] Date of Patent: Dec. 13, 1994

[54] SLIDING ROOF FOR AN AUTOMOBILE

[75] Inventors: Kozo Odoi; Seiichi Omoto; Ryuji Nonaka; Motoki Yoshida, all of Hiroshima, Japan

[73] Assignee: Mazda Motor Corporation, Hiroshima, Japan

[21] Appl. No.: 132,153

[22] Filed: Oct. 5, 1993

Related U.S. Application Data

[63] Continuation-in-part of Ser. No. 847,695, Mar. 9, 1992, abandoned.

[30] Foreign Application Priority Data

Mar. 8, 1991 [JP] Japan ................. 3-043736
Mar. 22, 1991 [JP] Japan ................. 3-058958

[51] Int. Cl.⁵ .............................. B60J 7/047
[52] U.S. Cl. ................... 296/214; 296/216; 296/220; 296/223; 318/484; 49/29; 49/127
[58] Field of Search .......... 296/214, 216, 220, 223; 318/466, 484; 49/29, 63, 68, 95, 103, 127

[56] References Cited

U.S. PATENT DOCUMENTS

| | | | |
|---|---|---|---|
| 4,331,359 | 5/1982 | Sheldon | 49/63 X |
| 4,707,022 | 11/1987 | Roos et al. | 296/222 |
| 4,811,985 | 3/1989 | Kruger et al. | 296/214 |
| 4,893,869 | 1/1990 | Fuerst | 296/220 |

FOREIGN PATENT DOCUMENTS

| | | | |
|---|---|---|---|
| 3223136 | 3/1983 | Germany | 296/220 |
| 58-25722 | 2/1983 | Japan . | |
| 61-92920 | 5/1986 | Japan . | |
| 61-152517 | 9/1986 | Japan . | |
| 0226325 | 10/1986 | Japan | 296/214 |
| 1-176522 | 12/1989 | Japan . | |

*Primary Examiner*—Dennis H. Pedder
*Attorney, Agent, or Firm*—Keck, Mahin & Cate

[57] ABSTRACT

A sliding roof includes a light transmitting sliding sunroof and a light isolating sliding sunshade disposed beneath the sunroof. The light transmitting sliding sunroof opens a roof opening only while the light isolating sliding sunshade is in its open position. Also, the light isolating sliding sunshade closes the roof opening only while the light transmission sliding sunroof is in its closed position. Damage to the light isolating sliding sunshade, therefore, is prevented.

7 Claims, 11 Drawing Sheets

SLIDING ROOF FOR AN AUTOMOBILE

This is a continuation-in-part of application Ser. No. 07/847,695, filed Mar. 9, 1992, now abandoned.

BACKGROUND OF THE INVENTION

1. Field of the Invention

The present invention relates to a roof for an automotive vehicle and, more particularly, to a roof having a sliding sunroof and a sliding sunshade.

In a known roof construction, the roof includes a sliding sunroof and a sliding sunshade. The sliding sunroof and sunshade are provided for isolating sunlight, and slide beneath a rear, fixed vehicle roof surface, starting from a closed position, to open a vehicle roof window. Typically, the sunroof and sunshade are independently operated to open and close a vehicle roof opening or window. In such a roof construction, the sunroof is easily left opened and, accordingly, the sunshade may be exposed to adverse weather or sunlight. If the vehicle is traveling and the sunshade is exposed to such adverse weather, the sunshade, which is generally lower in structural strength than the sunroof, can possibly be damaged due to negative pressure directly applied thereto. In addition, the sunshade, which is generally tinted so as to isolate sunlight, provides poor visibility. It is, therefore, difficult to make certain that the sunroof is closed.

2. Description of Related Art

In order to enable a sliding sunshade to move only a short distance and yet open the roof opening completely, it has been proposed to divide sunshades into two, i.e., front and rear, sunshade portions. Such a construction is described in, for instance, Japanese Utility Model Application No. 56(1981)-121,126, entitled "Sunshade for Vehicle Roof Window," filed Sep. 14, 1981 and laid open to the public as Japanese Unexamined Utility Model Publication No. 58(1983)-25,722 on Feb. 18, 1983. In the "double sunshade" structure described in the above-mentioned publication, a link means is provided for linking front ends of the front and rear sunshades when opening the roof window and the rear end of the front sunshade with the front end of the rear sunshade when closing the roof window. Consequently, the front and rear sunshades should overlap so that one of the sunshades is located over the other in their opened positions. In addition, whenever sunlight is needed by passengers of a rear seat of the vehicle but not by passengers of a front seat, the situation can not be properly governed by the double sunshade structure described in the above-mentioned publication.

SUMMARY OF THE INVENTION

It is an object of the present invention to provide a roof for an automotive vehicle in which a sliding sunshade is never exposed to the weather.

This object is achieved by providing a particularly constructed "sliding roof," having a light transmissive sliding sunroof and an opaque or light isolating sliding sunshade. Such a sliding roof is used in an automotive vehicle for opening and closing a roof opening formed in a vehicle roof. The sliding roof includes sunroof drive means, such as a reversible electric motor, for moving the light transmitting or transmissive sliding sunroof between its open and closed positions. The sliding roof also includes sunshade drive means, such as a reversible electric motor, for moving the light isolating sliding sunshade, disposed beneath the sunroof, between its open and closed positions. The drive means for the sliding sunroof is controlled so that it is activated to move the light transmissive sliding sunroof toward its open position only after the light isolating sliding sunshade is in its open position when a manually operated sunroof switch is operated to open the roof opening due to a demand for sunlight. On the other hand, the drive means for the sliding sunshade is controlled so that it is activated to move the light isolating sliding sunshade toward its closed position only after the light transmissive sliding sunroof is in its closed position when a manually operative sunshade switch is operated to close the roof opening due to a demand for shade and blocking of sunlight.

To control the sunroof drive means, a time delay means, such as a time delay circuit, is provided for activating the sunroof drive means with a predetermined time delay from activation of the sunshade drive means when the manually operated sunroof switch is operated to open the roof opening. Similarly, to control the sunshade drive means, a time delay means, such as a time delay circuit, is provided for activating the sunshade drive means with a predetermined time delay from activation of the sunroof drive means when the manually operated sunshade switch is operated to close the roof opening.

The light isolating sliding sunshade is formed by a front half sunshade and a rear half sunshade, which are releasably connected by a link mechanism so that when the front half sunshade is forced toward its open position, it is automatically disconnected from the rear half sunshade when the rear half sunshade is fully moved to its open position and connected to the rear sunshade when it is fully moved out of its closed position.

The link mechanism is preferably manually operated to disconnect the front and rear half sunshades from each other when they are in their closed positions.

BRIEF DESCRIPTION OF THE DRAWINGS

The above and other objects and features of the invention will be apparent to those skilled in the art from the following description of a preferred embodiment thereof when considered while referring to the drawings, in which.

BRIEF DESCRIPTION OF THE PREFERRED EMBODIMENT

Referring to the drawings in detail and, in particular, to FIGS. 1 through 10, a top roof of a car body, in which a power sliding sunroof system according to a preferred embodiment of the present invention is installed, is shown. The top roof 1 of the car body includes an outer stationary roof 2A and a sliding sunroof 3, forming part of the power sliding sunroof system, for opening and closing a skylight window or outer roof opening 4A formed in the outer stationary roof 2A. In addition to the sliding sunroof 3, the power sliding sunroof system includes a sliding sunshade 5 for isolating sunlight passing through the sliding sunroof 3, disposed beneath the sliding sunroof 3. The sliding sunshade 5 is divided into two portions, namely, front and rear sunshade portions, or sunshades 5A and 5B. The sliding sunroof 3, made of a transparent material such as glass and plastic, is configured so as to sufficiently close the outer roof opening 4A. The sliding sunroof 3 slides back and forth, in a lengthwise direction of the car body, in the outer roof opening 4A on a pair of right and left lateral guide rails 6 of a sunroof drive means or mechanism. The sunroof drive means or mechanism includes an electric motor 7A and will be described later. The sliding sunshade 5, made of an opaque material, is configured so as to sufficiently close an inner roof opening 4B, which is formed in an inner stationary roof 2B which is smaller in size than the outer roof opening 4A. The front and rear sunshades 5A and 5B independently slide back and forth, in the lengthwise direction of the car body, in the inner roof opening 4B.

Figure 1:
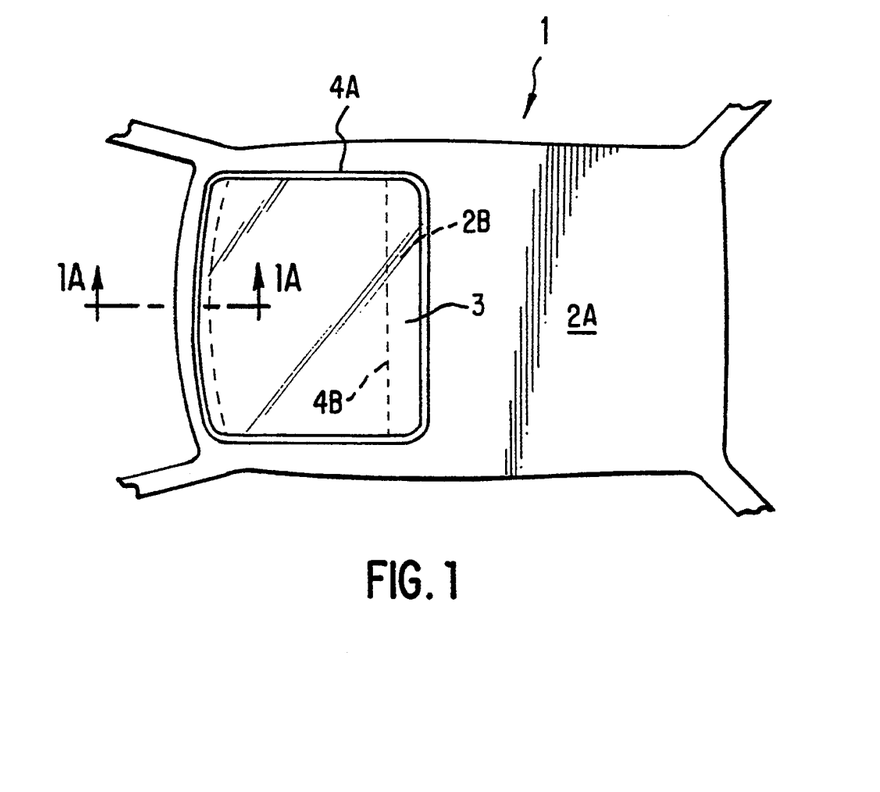
FIG. 1 is a top view of a top roof of an automotive vehicle having a sliding roof in accordance with a preferred embodiment of the present invention.
Figure 1A:
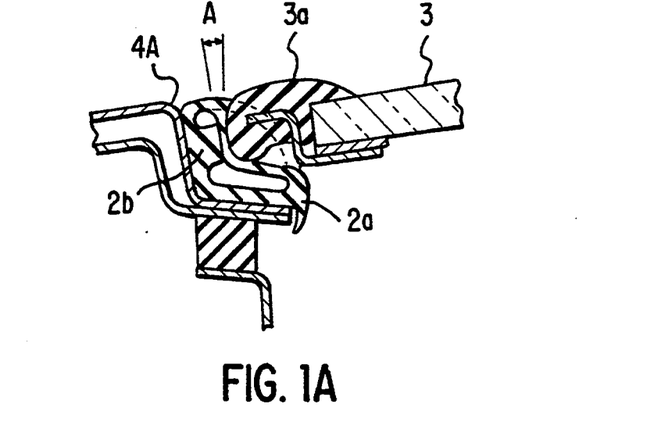
FIG. 1A is a cross-sectional view along line 1A—1A of FIG. 1.
Figure 2:
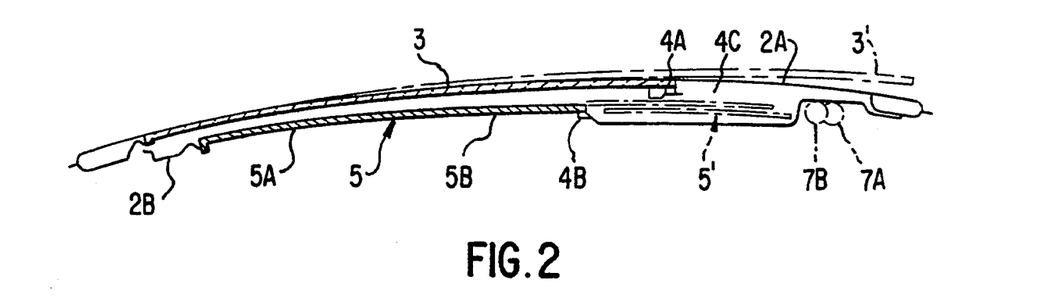
FIG. 2 is a cross-sectional view of a sliding roof in which a sliding sunroof and a sliding sunshade are fully closed.

As is shown in FIG. 1A, the sliding sunroof 3 is provided with an outer seal 3a around its outer periphery. The outer stationary roof 2A is provided with a weather strip 2a surrounding the outer roof opening 4A. The weather strip 2a is formed, at its four corners, with stopper portions 2b, against which the seal 3a of the sliding sunroof 3 abuts when it closes the outer roof opening 4A. The stopper portions 2b function to keep a desired gap between the sliding sunroof 3 and the outer roof opening 4A. The stopper portions, therefore, provide good sealing and prevent uneven wearing of the weather strip 2b. For firmly receiving the front end of the outer seal 3a when the sliding sunroof 3 is closed, the rear surfaces of the stopper portions 2b are desirably inclined at a slight angle A.

Sliding of the sliding sunroof 3 is performed by the sunroof drive mechanism, including a pair of, i.e., right and left, lateral arms 9, each being secured to the under surface of the sunroof 3 and extending outside each lateral guide rail 6, and a pair of, i.e., inside and outside, guide rollers 10 and 11, disposed on opposite sides of each lateral arm 9 and coaxially mounted for rotation on the front portion of the lateral arm 9. As is clearly shown in FIGS. 7, 8A and 8B, the inside guide roller 10 is rotatively received in a guide groove 12 formed in the outside of the lateral guide rail 6 so as to smoothly roll or turn in the guide groove 12. The lateral arm 9 is formed with a guide slot 13, generally extending in the lengthwise direction. The guide slot 13 includes four guide slot portions: a front horizontal guide slot portion 13a; a transitional guide slot portion 13b, inclined rearwardly and down; a rear horizontal guide slot portion 13c, disposed parallel to the front horizontal guide slot portion 13a and connected to the front horizontal guide slot portion 13a through the transitional guide slot portion 13b; and an open-ended tail slot portion 13d, extending vertically and down from the rear end of the rear horizontal guide slot portion 13c. Outside the lateral arm 9, there is disposed a generally T-shaped swing arm 14, having an upright arm portion 14b extending vertically and a tail arm portion 14a extending rearward from the middle of the upright arm portion 14b. The tail arm portion 14a of the swing arm 14 is formed with a generally horizontal guide slot 15, a rear end portion of which is inclined upward. The upright arm portion 14b of the swing arm 14 is formed with a guide slot 16, extending in a lengthwise direction of the upright arm portion 14b, in which the outside guide roller 11 is rotatively received.

Inside the generally T-shaped swing arm 14, there is disposed a first slide lever 17 for sliding back and forth. The first slide lever 17, which is connected to the electric motor 7A of the sunroof drive mechanism by a wire 18, has a guide pin 19 slidably received in and guided by both the guide slot 13 of the lateral arm 9 and the guide slot 15 of the swing arm 14. A guide roller 20, supported for rotation by a rear end portion of the first slide lever 17, is rotatively received in and guided by a guide groove 23 formed in a connection arm 22. The connection arm 22 extends in the lengthwise direction of the car body, and forms part of a sunroof tilt means or mechanism 21.

Figure 4:
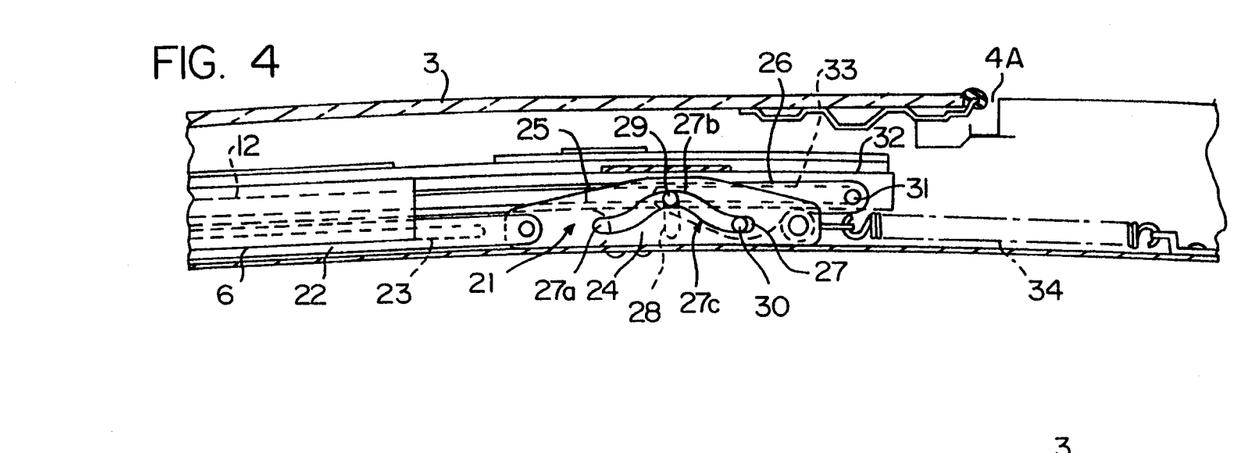
FIG. 4 is an enlarged cross-sectional view of a rear portion of the sliding sunroof when the sliding sunroof is fully closed.
Figure 6:
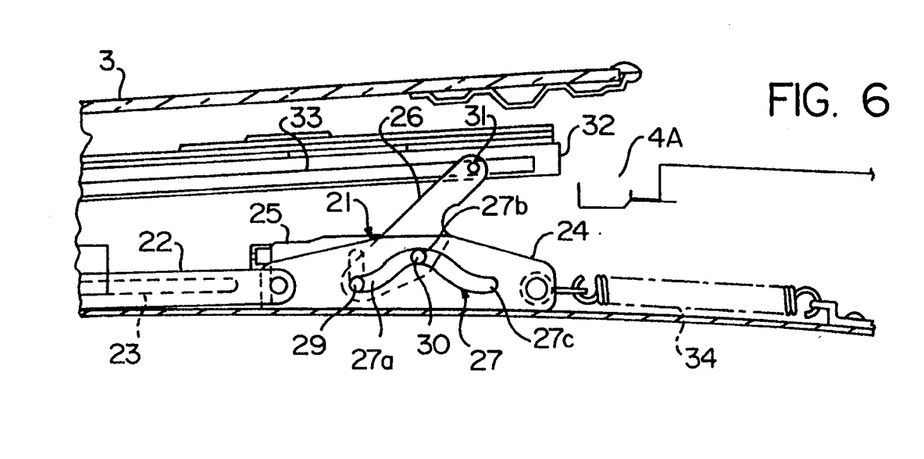
FIG. 6 is an enlarged cross-sectional view of the rear portion of the sliding sunroof when the sliding sunroof is fully closed and tilted up.
Figure 7:
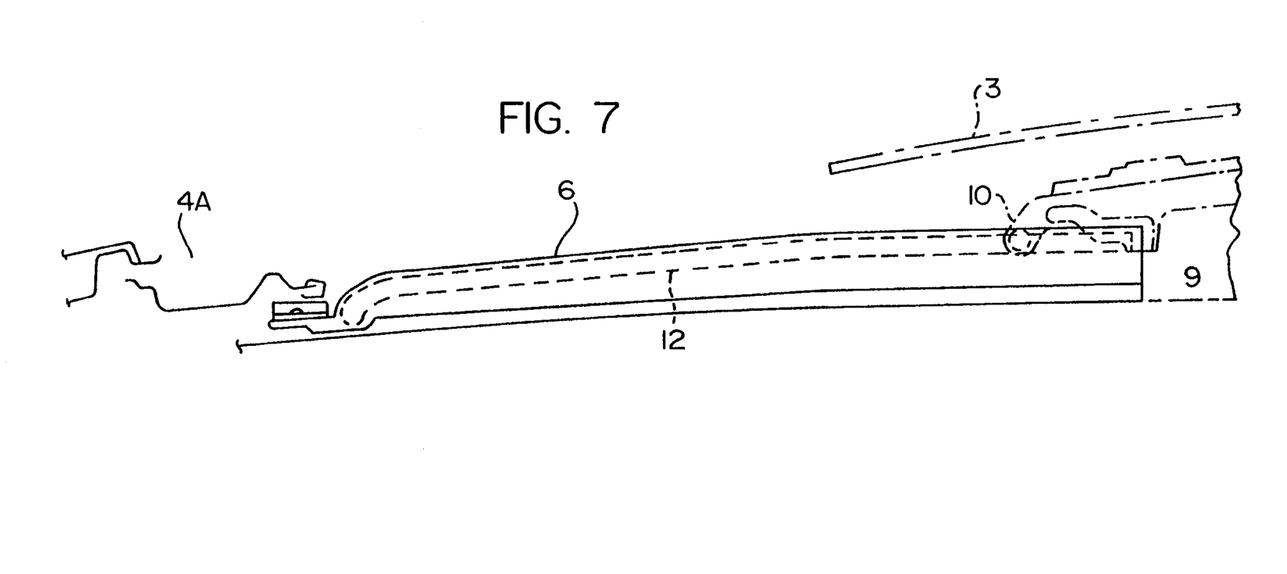
FIG. 7 is an enlarged cross-sectional view of the front portion of the sliding sunroof when the sliding sunroof is fully opened.
Figure 8:
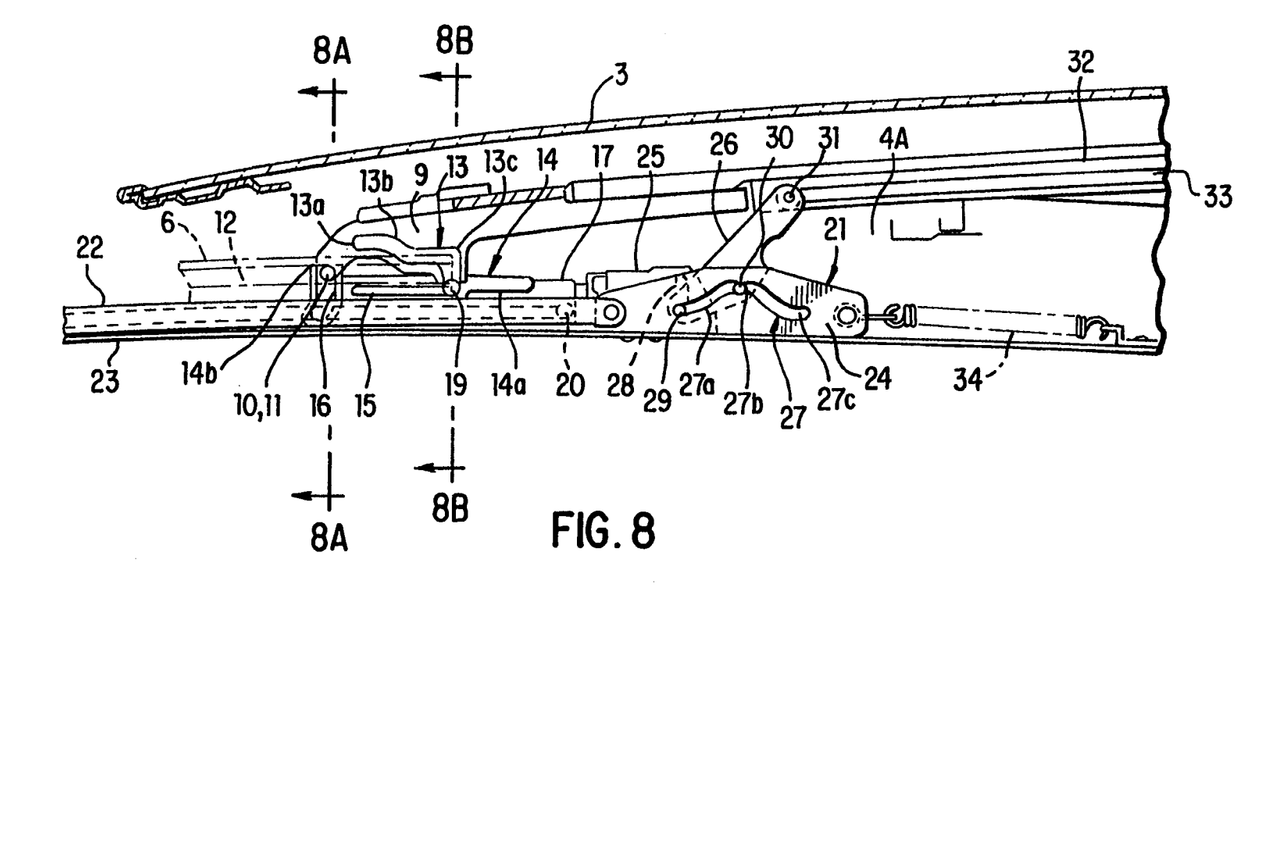
FIG. 8 is an enlarged cross-sectional view of the rear portion of the sliding sunroof when the sliding sunroof is fully opened.
Figure 8A:
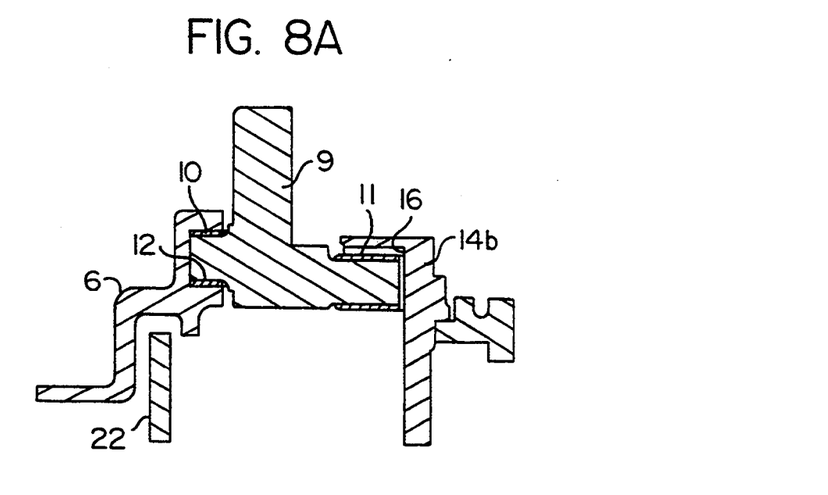
FIG. 8A is a cross-sectional view along line 8A—8A of FIG. 8.
Figure 8B:
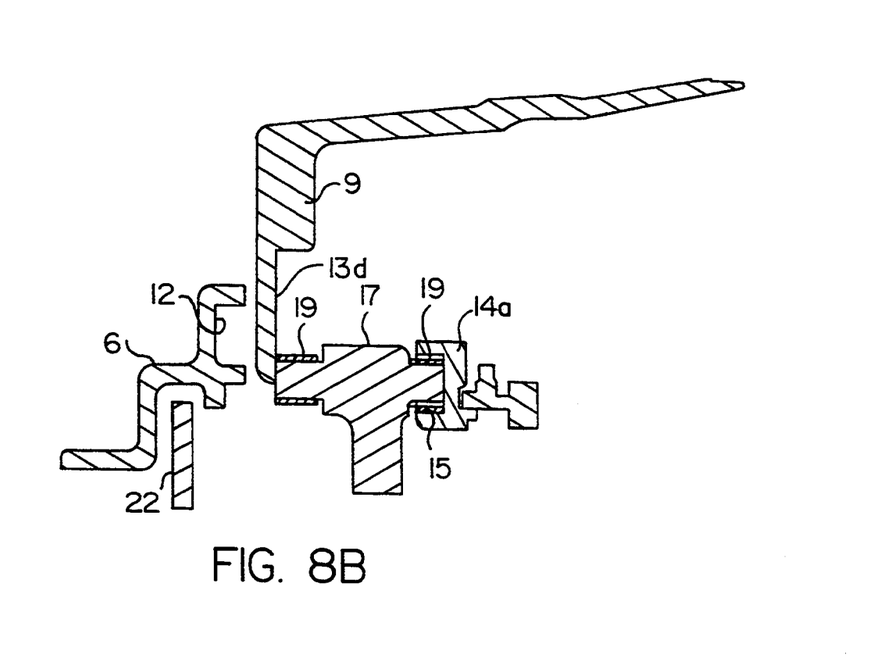
FIG. 8B is a cross-sectional view along line 8B—8B of FIG. 8.

Referring now in particular to FIGS. 4, 6 and 8, the sunroof tilt mechanism 21 may be seen to include a second slide lever 24, connected to the rear end of the connection arm 22, a support bracket 25, disposed on an outer side of the second slide lever 24 and secured to the car body, and a link lever 26, disposed on the outer side of the support bracket 25. The second slide lever 24 is formed with a generally V-shaped guide slot 27, having front, intermediate and rear positioning portions 27a, 27b and 27c for positioning the link lever 26. The intermediate positioning portion 27b is at a distance equal from the front and rear positioning portions 27a and 27c. The support bracket 25 is formed with a vertical guide slot 28, spatially crossing the V-shaped guide slot 27. The link lever 26 is provided with a pair of, i.e., front and rear, guide pins 29 and 30 at its lower end portion. The front guide pin 29 is slidably received in both the guide slot 27 of the second slide lever 24 and the guide slot 28 of the support bracket 25. The rear guide pin 30 is received in the guide slot 27 of the second slide lever 24. It is to be noted that the front and rear guide pins 29 and 30 are separated from each other by the same distance as the intermediate positioning portion 27b is separated from the front and rear positioning portions 27a and 27c. The link lever, on the other hand, is further provided, at its upper end portion, with a guide roller 31 rotatively received in and guided by a guide groove 33 formed in a guide rail 32, which is secured to the under surface of the sunroof 3 and extends in the lengthwise direction of the car body. Between the second slide lever 24 and the car body, there is a spring 34 for urging the second slide lever 24 rearward upon opening of the sunroof 3.

Figure 3:
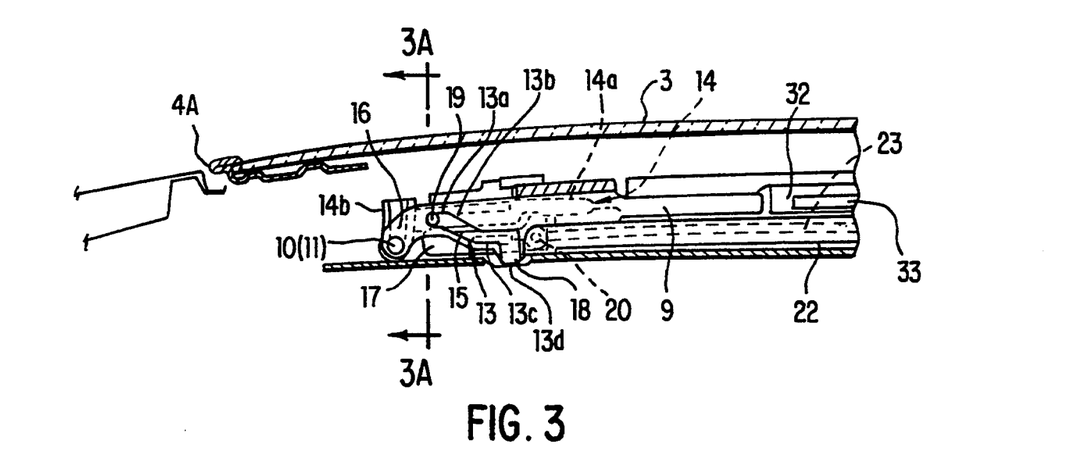
FIG. 3 is an enlarged cross-sectional view of a front portion of the sliding sunroof when the sliding sunroof is fully closed.
Figure 3A:
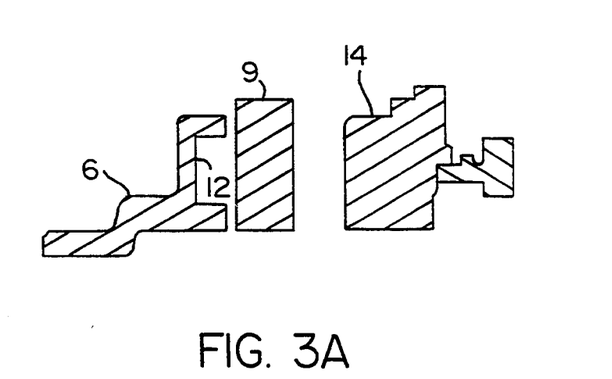
FIG. 3A is a cross-sectional view along line 3A—3A of FIG. 3.
Figure 5:
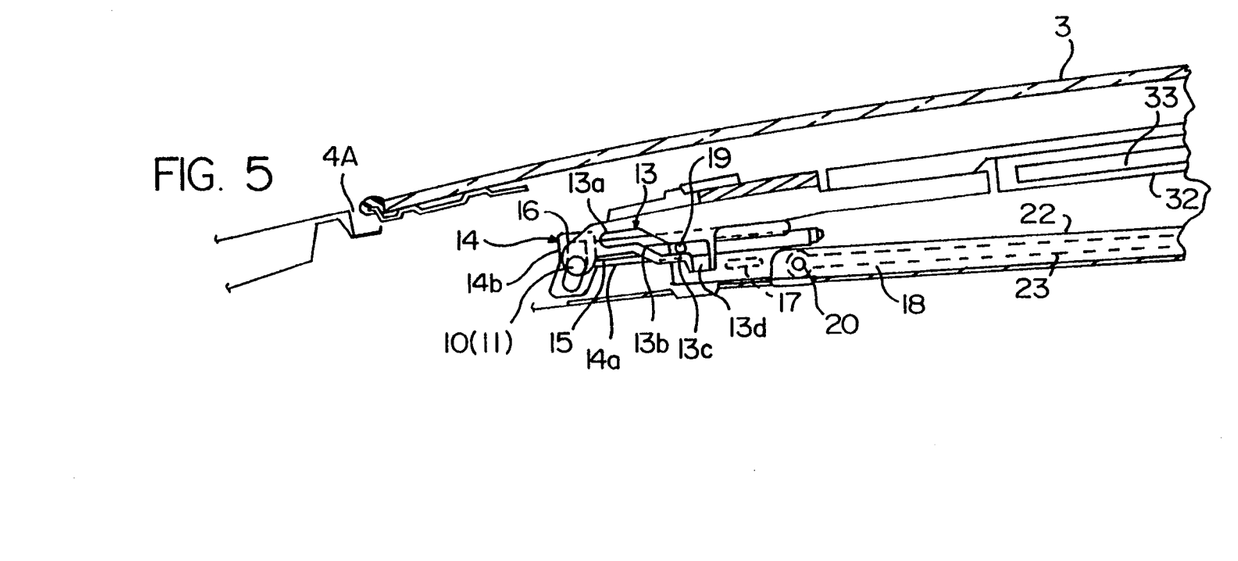
FIG. 5 is an enlarged cross-sectional view of the front portion of the sliding sunroof when the sliding sunroof is fully closed and tilted up.

The sunroof drive mechanism positions the lateral arm 9, the first slide lever 17 and the link lever 26, as shown in FIGS. 3 and 4, in their closed positions which places the sunroof 3 in its fully closed position. That is, the lateral arm 9 is positioned so that the inside and outside guide rollers 10 and 11 of the lateral arm 9 are in the front end of the guide groove 12 of the lateral guide rail 6 and the lower end of the vertical guide slot 16 of the swing arm 14, respectively. On the other hand, the first slide lever 17 is positioned so that the guide pin 19 of the first slide lever 17 is in both the front end of the horizontal guide slot 15 of the swing arm 14 and the front horizontal guide slot portion 13a of the guide slot 13 of the lateral arm 9. Also, the guide roller 20 of the first slide lever 17 is in the front end of the guide groove 23 of the connection arm 22. The link lever 26 is positioned so that the front guide pin 29 of the link lever 26 is in both the upper end of the vertical guide slot 28 of the support bracket 25 and the intermediate positioning portion 27b of the V-shaped guide slot 27 of the second slide lever 24. Also, the rear guide pin 30 of the link lever 26 is in the rear positioning portion 27c of the V-shaped guide slot 27 of the second slide lever 24. When the electric motor 7A of the sunroof drive mechanism is activated, the first slide lever 17 is forced rearward through the wire 18, so as to allow the second slide lever 24 of the sunroof tilt mechanism 21 to slide rearward under the tension force of the spring 34. With the rearward sliding movement of the first slide lever 17, the guide pin 19 of the first slide lever 17 slides rearward in the guide slot 13 from the front horizontal guide slot portion 13a to the rear horizontal guide slot portion 13c of the lateral arm 9. The guide pin 19 has its movement restricted by the guide slot 15 of the swing arm 14. This sliding movement of the first slide lever 17 causes the lateral arm 9 to turn slightly in a counterclockwise direction, as shown in FIG. 5, so that the inside and outside guide rollers 10 and 11 slide slightly upward in the guide groove 12 of the lateral guide rail 6 and the guide slot 16 of the swing arm 14. On the other hand, during the action of the sunroof drive mechanism, with the rearward sliding movement of the second slide lever 24 of the sunroof tilt mechanism 21 accompanying the sliding movement of the first slide lever 17 of the sunroof drive mechanism, the front guide pin 29 of the link lever 26 slides down to the lower end of the guide slot 28 of the support bracket 25 and to the forward end of the front positioning portion 27a of the guide slot 27 of the second slide lever 24. Simultaneously, the rear guide pin 30 of the link lever 26 slides upward to the intermediate positioning portion 27b of the guide slot 27 of the second slide lever 24. As a result, the link lever 26 rises up at, for instance, approximately 45 degrees with respect to a horizontal plane, as shown in FIG. 6, so as to tilt up the sunroof 3.

As the electric motor 7A continues to rotate, following the tilting-up of the sunroof 3, the sunroof drive mechanism forces the guide pin 19 of the first slide lever 14 to slide, on one hand, in the guide slot 15 of the swing arm 14 toward the rear end of the guide slot 15 and, on the other hand, out of the open-ended tail slot portion 13d of the guide slot 13 of the lateral arm 9, so that the lateral arm 9 is released from restriction by the guide pin 19. The guide roller 20 of the first slide lever 17 continuously slides in the guide groove 23 of the connection arm 22 to the rear end of the guide groove 23, as shown in FIG. 8, and then opens the sunroof 3. When the sunroof 3 is opened, the guide roller 31 of the link lever 26 is located at the front end of the guide groove 33.

Figure 9:
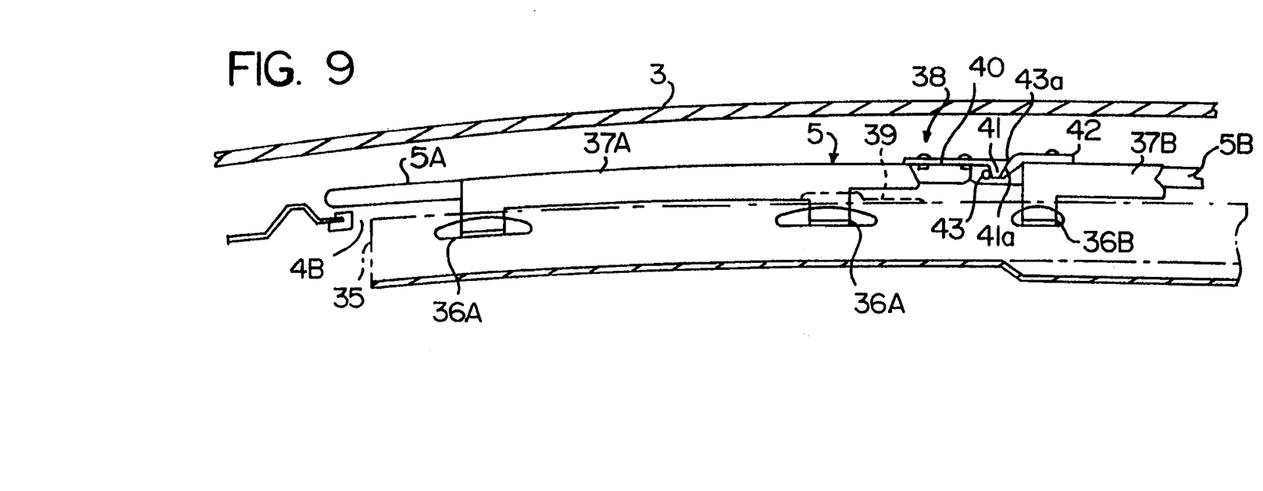
FIG. 9 is an enlarged cross-sectional view of a front portion of the sliding sunshade when the sliding sunshade is fully closed.
Figure 10:
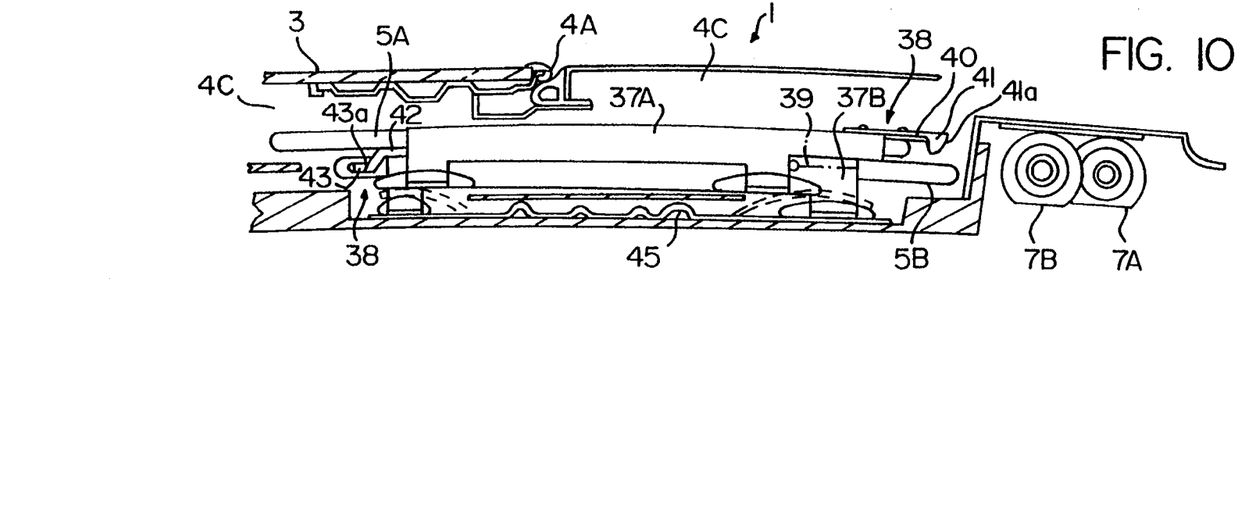
FIG. 10 is an enlarged cross-sectional view of the sliding sunshade when the sliding sunshade is fully opened.

Referring to FIGS. 9 and 10 in conjunction with FIG. 1, the sunshade 5, having the front and rear sunshades 5A and 5B, has front and rear brackets 37A and 37B, secured to the front and rear sunshades 5A and 5B, respectively. Each of the brackets 37A and 37B has front and rear guide shoes 36A and 36B, respectively. These guide shoes 36A and 36B are slidably guided for back and forth movement by a guide rail 35 provided at each side of the inner roof opening 4B. The front bracket 37A of the front sunshade 5A is connected, through a looped wire 39, to and moved back and forth by a sunshade drive means or mechanism, including an electric motor 7B (see FIG. 10). The front and rear brackets 37A and 37B are releasably linked with each other by a link means 38. As is shown in detail in FIGS. 11 and 11A to 11C, the link means 38 includes a bendable front link lever 40, secured to the rear end of the front bracket 37A, and a rear link arm 42, supported for laterally inward sliding movement by the front end portion of the rear bracket 37B. The front link lever 40 is provided, at its rear end, with a hook 41 extending downward therefrom and having an inclined rear end surface 41a. The hook 41 has a connection tong 41b formed at its lower end and extending laterally inward. The rear link arm 42 is formed, at its front end portion, with a connection opening 43 which is formed so as to be engaged by the connection tong 41b of the hook 41 of the front link lever 40. The rear link arm 42 has a generally L-shaped formation having a front arm portion 42a, extending forward in the lengthwise direction and formed with the connection opening 43 at its forward end portion, and a base portion 42b, extending laterally inward. The connection opening 43 opens laterally and to the outside of the front arm portion 42a so as to disengage or release the hook 41 of the front link lever 40 when the rear link arm 42 is manually slid laterally inward, as will be described later. The connection opening 43 is further open at its rear toward a slope 42c formed in the front arm portion 42a. When the front link lever 40 is forced rearward, the connection tong 41b of the hook 41 first escapes out from the connection opening 43. Then, the connection tong 41b is guided upward by the slope 42c of the front arm portion 42a so as to disconnect the front link lever 40 from the rear link arm 42, thereby uncoupling the front sunshade 5A from the rear sunshade 5B.

Figure 11:
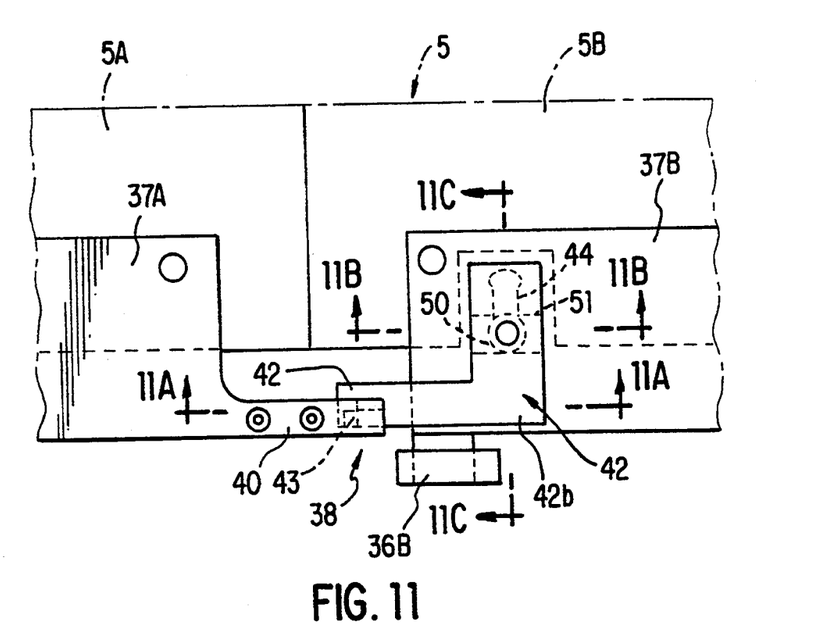
FIG. 11 is a plan view of a link mechanism for releasably connecting front and rear sunshades.
Figure 11A:
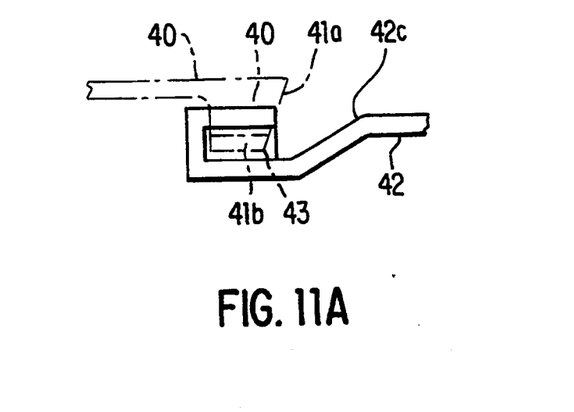
FIGS. 11A, 11B and 11C are cross-sectional views along lines 11A—11A, 11B—11B and 11C—11C, respectively, of FIG. 11.
Figure 11B:
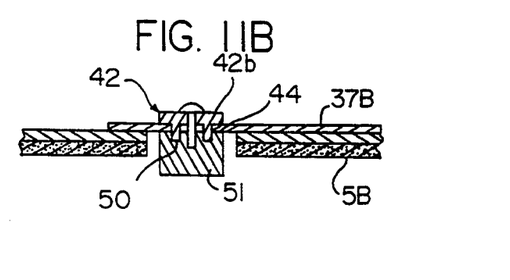
Figure 11C:
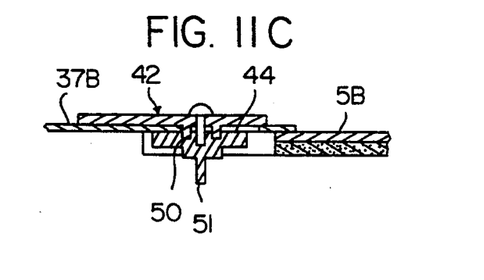

As is most clearly shown in FIGS. 11B and 11C, the base portion 42b of the rear link arm 42 has a guide bush 50, integrally formed with or otherwise secured to the under surface of the base portion 42b. The base portion 42b of the rear link arm 42 further has a knob 51 bolted to the guide bush 50 so as to slidably grip the rear bracket 37B between the rear link arm 42 and the knob 51. The knob 51 extends into the interior of the vehicle compartment for access to the rear link arm 42. On the other hand, the rear bracket 37B has a guide groove 44 formed in its upper surface and extending in the transverse direction. The guide bush 50 can snugly slide in the transverse direction. As long as the connection opening 43 of the rear link arm 42 is engaged by the tong 41b of the hook 41 of the front link lever 40, the link means 38 rigidly connects or couples the front and rear sunshades 5A and 5B together, so as to make the sunshade 5 a flat surfaced single unit. However, when manually sliding the knob 51 and, therefore, the guide bush 50 of the rear link arm 42 in the guide groove 44, inwardly in the transverse direction, the connection opening 43 of the rear link arm 42 disengages or releases the tong 41b of the hook 41 of the front link lever 40, so as to disconnect or uncouple the front link lever 40 from the rear link arm 42. As a result, the front and rear sunshades 5A and 5B are operationally disconnected or uncoupled from each other and are rendered independently slidable.

As is most clearly shown in FIG. 10, adjacent to and behind the inner roof opening 4B, there is provided a sunshade storage chamber 4C, formed between the outer and inner stationary roofs 2A and 2B, into which the front and rear sunshades 5A and 5B enter through a front opening so that one of the sunshades overlaps the other. In the sunshade storage chamber 4C, there is disposed a corrugated leaf spring 45, which is formed so that it is not deformed by the rear sunshade 5B when housed in the sunshade storage chamber 4C but rather flattened by the overlapped front and rear sunshades 5A and 5B when housed in the sunshade storage chamber 4C.

While the sunshade 5 is in its closed position, as shown in FIG. 9, for closing the inner roof opening 4B formed in the inner stationary roof 2B and isolating the vehicle interior from sunlight, the front and rear sunshades 5A and B are connected to each other by the link means 38. In particular, the hook 41 of the bendable hook lever 40 is captured in the rear link opening 43 of the connection arm 42.

When the electric motor 7B is activated in order to open the inner roof opening 4B when a demand for sunlight is present, the front and rear sunshades 5A and 5B are pulled rearward, as one whole unit, by the looped wire 39 until the rear sunshade 5B is completely received within the sunshade storage chamber 4C. Then, when the front sunshade 5A is further forced rearward, the tong 41b of the front link lever 41 is bent and guided upward along the slope 42c of the rear link arm 42, so that the front sunshade 5A moves over the rear sunshade 5B into the sunshade storage chamber 4C. During movement of the front sunshade 5A into the sunshade storage chamber 4C, the leaf spring 45 is compressed so as to deform and allow both the front and rear sunshades 5A and 5B to be stored within the sunshade storage chamber 4C.

When the electric motor 7B is activated to turn in the reverse direction and slide the sunshade 5 out of the sunshade storage chamber 4C for closing the inner roof opening 4B, the front sunshade 5A is forced by the looped wire 39 to initially slide forward over the rear sunshade 5B. When the front sunshade 5A has almost come out of the sunshade storage chamber 4C, the rear sunshade 5B, still stored in the sunshade storage chamber 4C, is forced upward by the leaf spring 45. This automatically brings the tong 41b of the hook 41 of the bendable hook lever 40 into a position in which it is ready for engagement with the connection opening 43 of the rear link arm 42. Immediately after the front sunshade 5A fully comes out of the of the sunshade storage chamber 4C, the connection opening 43 of the rear link arm 42 is engaged by the tong 41b of the front link lever 40, so as to rigidly connect or couple the front and rear sunshades 5A and 5B of the sunshade 5 so that they form one unit. As the electric motor 7B continues to turn in the reverse direction, the front sunshade 5A, with which the rear sunshade 5B is coupled together, is further pulled forward until the rear sunshade 5B fully comes out of the sunshade storage chamber 4C, closing completely the inner roof opening 4B.

Figure 12:
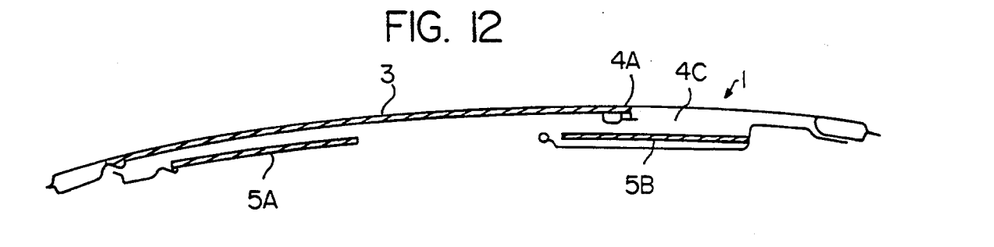
FIG. 12 is a cross sectional view of the sliding roof, similar to FIG. 2, in which the sliding sunshade is separated into two parts.

In the event that only rear seat passengers of the vehicle wish to adjust the amount of sunlight entering the vehicle, the knob 51 of the rear link arm 42, secured to the rear bracket 37B for the rear sunshade 5B, is manually operated so that it moves laterally inward. This operation of the knob 51 disengages the connection opening 43 from the tong 41b of the front link lever 40, allowing the rear sunshade 5B to be manually moved rearward and forward independently of the front sunshade 5A. Such opens and closes the rear half of the inner roof opening 4B while the front sunshade 5A is left in its closed position, as is shown in FIG. 12.

Figure 13:
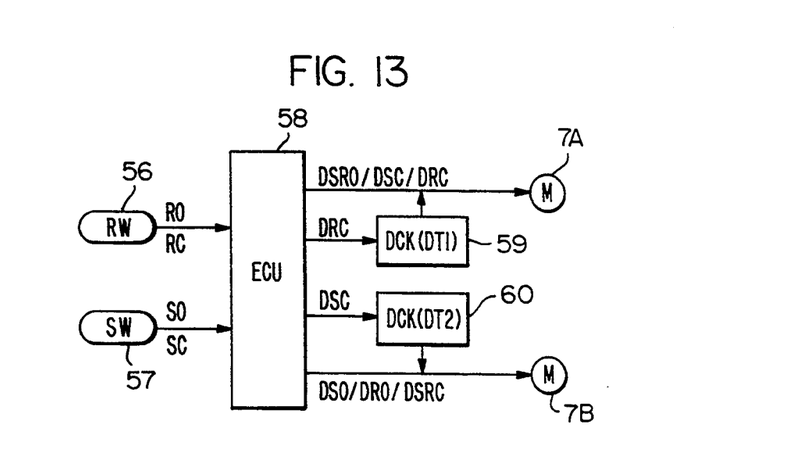
FIG. 13 is a block diagram illustrating a control unit for the sliding roof.

For controlling opening and closing of a sliding roof which is constructed in the manner described above, there is provided an electronic control unit (ECU) 58, mainly comprising a general purpose microcomputer, shown in FIG. 13. The control unit 58 receives output signals from a first or sunroof switch (RW) 56 and a second or sunshade switch (SW) 57. Such first and second switches may be two-way switches which are manually operated according to demands for opening and closing of the sliding sunroof 3 and the sliding sunshade 5, respectively. The control unit 58 provides control signals to first and second delay circuits (DCK) 59 and 60 (hereinafter referred to as a sunroof delay circuit and a sunshade delay circuit, respectively), forming electric timers, provided in association with the electric motors 7A and 7B, respectively. The sunroof switch 56 has two positions, namely, an open position, which is selected to open the sliding sunroof 3, and a closed position, which is selected to close the sliding sunroof 3, and is manually operated by a driver or a passenger in the vehicle so that it is placed into its open and closed positions. Similarly, the sunshade switch 57 has two positions, namely, an open position, which is selected to open the sliding sunshade 5, and a closed position, which is selected to close the sliding sunshade 5. The sunshade switch is manually operated by a driver or a passenger in the vehicle so that it is placed into its open and closed positions. The sunroof delay circuit 59 activates the electric motor 7A with a time delay when both the sliding sunroof 3 and sliding sunshade 5 are in their closed positions so as to open the sliding sunroof 3. The sunshade delay circuit 60 activates the electric motor 7B with a time delay when both the sliding sunroof 3 and sliding sunshade 5 are in their open positions so as to close the sliding sunshade 3.

Figure 14:
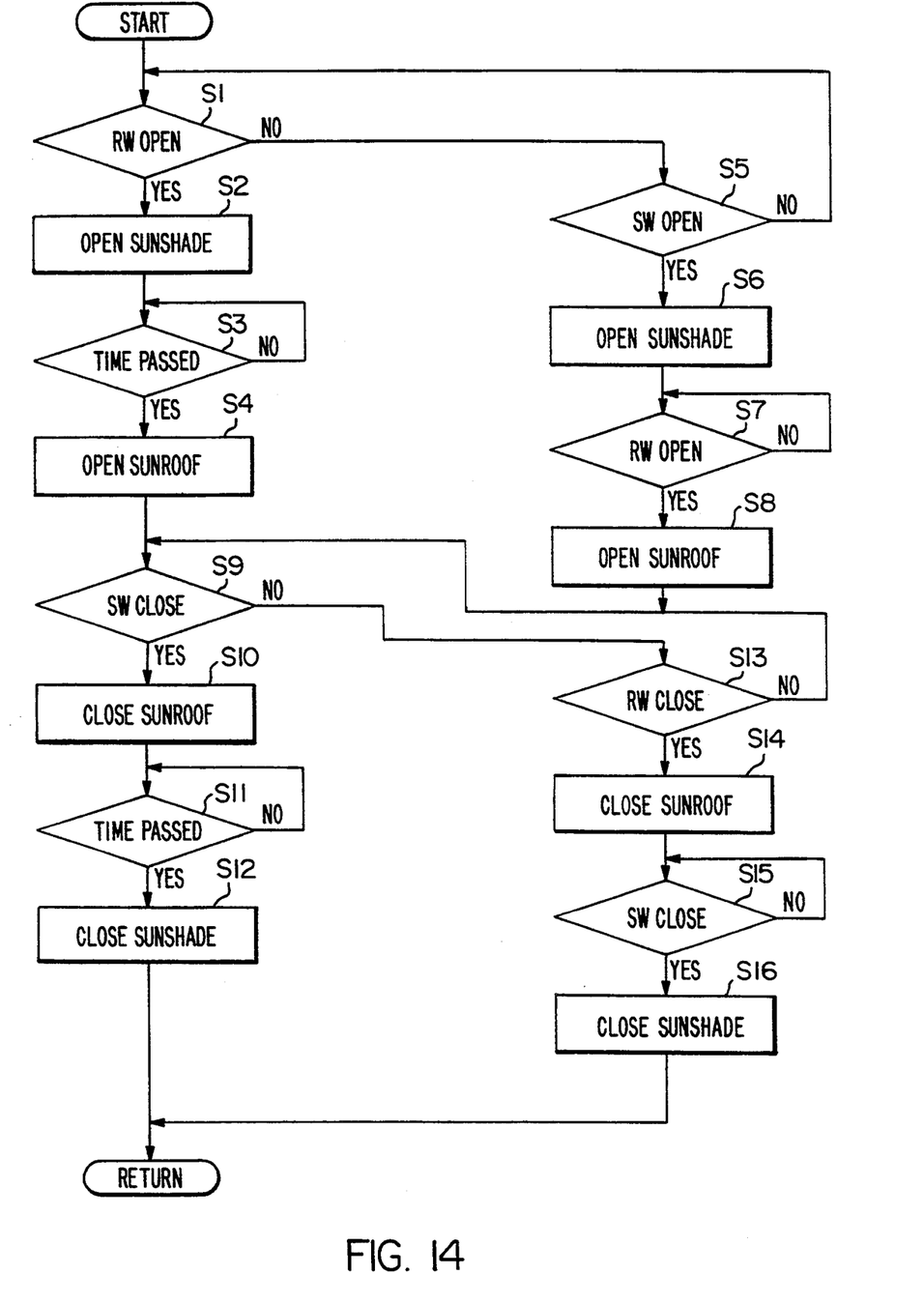
FIG. 14 is a flow chart illustrating a sunroof drive control sequence for a microcomputer of the control unit.

The operation of the sliding roof shown in FIGS. 1 through 10 is best understood by reviewing FIG. 14, which is a flow chart illustrating a sliding roof control sequence for the microcomputer of the control unit 58. Programming a computer is a skill well understood in the art. The following description is written to enable a programmer having ordinary skill in the art to prepare an appropriate program for the microcomputer of the control circuit. The particular details of any such program would, of course, depend upon the architecture of the particular computer selected.

Referring to FIG. 14, before providing power to the control unit 58, it is assumed that both the sliding sunroof 3 and the sliding sunshade 5 are in their closed positions. Upon the provision of power to control unit 58, a decision is made at step S1 as to whether the sunroof switch 56 is operated to select its open position to open the sliding sunroof 3. If the answer to the decision is "YES," this indicates that the sunroof switch 56 actually has been moved to its open position and provides an open signal RO to the control unit 58. Then, the control unit 58, responding to the presence of the open signal RO, provides a drive signal DRO, on one hand, directly to the electric motor 7B and, on the other hand, to the electric motor 7A through the sunroof delay circuit 59. Upon receiving the drive signal DRO, the electric motor 7B immediately starts to rotate in a normal direction (hereafter referred to as an opening direction), opening the sliding sunshade 5 at step S2. Simultaneously, a decision is made at step S3 as to whether the sunroof delay circuit 59 has counted out a first delay time DT1, which is predetermined to be as long as is needed to fully open the sliding sunshade 5. This decision is repeated until the first delay time DT1 has elapsed. When the sunroof delay circuit 59 has counted out the first delay time DT1, the answer to the decision made at step 53 becomes "YES." Then, the electric motor 7A receives the drive signal DRO and immediately starts to rotate in the opening direction, opening the sliding sunroof 3 at step S4. Summarizing the steps S1 to S4, when both the sliding sunroof 3 and the sliding sunshade 5 are in their closed positions, operating the sunroof switch 56 to its open position causes the sunshade 5 to fully open before opening of the sunroof 3 begins. The delayed opening of the sunroof 3 prevents the sunshade 5 from being exposed to external air, so that the sunshade 5 is never subjected to a negative pressure created over the top roof 1 of the car body. Such is the case not only after but also during opening of the sunroof 3 while the vehicle is traveling.

If the answer to the decision at step S1 is "NO" this indicates that the sunroof switch 56 is out of both of its open and close positions. Then, another decision is made at step S5 as to whether the sunshade switch 57 is operated, due to a passenger's demand for sunlight through the sliding sunroof 3, to select its open position so as to open the sliding sunshade 5. If the answer to the decision is "YES," this indicates that the sunshade switch 57 actually is in its open position and provides an open signal SO to the control unit 58. Then, the control unit 58, responding to the presence of the open signal SO, provides a drive signal DSO directly to the electric motor 7B. Upon receiving the drive signal DSO, the electric motor 7B immediately starts to rotate in the opening direction, opening the sliding sunshade 5 at step S6. Almost simultaneously with the reception of the drive signal DSO by the electric motor 7B, a decision is made at step S7 as to whether the sunroof switch 56 is operated so that its open position is selected so as to open the sliding sunroof 3. This decision is repeated until the sunroof switch 56 is operated in response to a passenger's demand to open the sliding sunroof 3. When the sunroof switch 56 is actually operated to its open position and provides an open signal RD, the answer to the decision at step S7 immediately becomes "YES." As a result, the control unit 58 provides a drive signal DSRO directly to the electric motor 7A so as to cause it to rotate in the opening direction at step S8. It is apparent from the above description that, in any event, the sliding sunroof 3 is never opened before the sliding sunshade 5 has been opened, even if the sunroof switch 56 is operated first. Also, the sliding sunshade 5 is opened independently of the sliding sunroof 3 when the sunshade switch 57 is operated to its open position.

Under a state in which both the sliding sunroof 3 and the sliding sunshade 5 are in their opened positions, resulting from operations performed at steps S4 and S8 a decision is made, at step S9, as to whether the sunshade switch 57 is operated to select its close position to close the sliding sunshade 5. If the answer to this decision is "YES," this indicates that the sunshade switch 57 has actually been operated to select its close position and provides a close signal SC to the control unit 58. Then, the control unit 58, responding to the presence of the close signal SC, provides a drive signal DSC, on one hand, directly to the electric motor 7A and, on the other hand, to the electric motor 7B through the sunshade delay circuit 60. Upon receiving the drive signal DSC, the electric motor 7A immediately starts to rotate in a reverse direction (hereafter referred to as a closing direction), closing the sliding sunroof 3 at step S10. Simultaneously, a decision is made, at step S11, as to whether the sunshade delay circuit 60 counts up a second delay time DT2, which is predetermined to be as long as is needed to fully close the sliding sunroof 3. This decision is repeated until the second delay time DT2 has elapsed. When the sunshade delay circuit 60 has counted up the second delay time DT2, the answer to the decision at step S11 becomes "YES." Then, the electric motor 7B receives the drive signal DSC and immediately starts to rotate in the closing direction, closing the sliding sunshade 5 at step S12. When both the sliding sunroof 3 and the sliding sunshade 5 are in their opened positions, operating the sunshade switch 57 to its close position causes automatically a full closing of the sunroof 3 before closing of the sunshade 5 starts. The delayed closing of the sunshade 5 prevents the sunshade 5 from being exposed to external air. Consequently, the sunshade 5 is never subjected to a negative pressure created over the top roof 1 of the car body, either before or during the closing of the sunroof 3, while the vehicle is traveling. The final step orders another execution of the sliding roof control sequence.

If the answer to the decision made at step S9 is "NO," this indicates that the sunshade switch 57 is out of both of its open and close positions. Then, another decision is made, at step S13, as to whether the sunroof switch 56 has been operated to its close position so as to close the sliding sunroof 3. If the answer to this decision is "YES," this indicates that the close position of the sunroof switch 56 has actually been selected and that the switch 56 provides a close signal RC to the control unit 58. Then, the control unit 58, responding to the presence of the close signal RC, provides a drive signal DRC directly to the electric motor 7A. Upon receiving the drive signal DRC, the electric motor 7A immediately starts to rotate in the closing direction, closing the sliding sunroof 3 at step S14. Almost simultaneously with the reception of the drive signal DRC by the electric motor 7A, a decision is made, at step S15, as to whether the sunshade switch 57 is operated to select its close position so as to close the sliding sunshade 5. This decision is repeated until the sunshade switch 57 is operated. When the sunshade switch 57 is actually operated to its close position and provides a close signal SC, the answer to the decision at step S15 immediately becomes "YES." As a result, the control unit 58 provides a drive signal DSRC directly to the electric motor 7B so as to cause it to rotate in the closing direction at step S16.

It is apparent from the above description that the sliding sunshade 5 is opened before the sunroof 3 is opened when both the sunshade 5 and the sunroof 3 are in their closed positions. It is also apparent that the sunshade 5 is closed following closing of the sunroof 3 when both the sunshade 5 and the sunroof 3 are in their opened positions. Consequently, the sunshade 5 is never closed without first closing the sunroof 3, and the sunshade 5 is never opened until after the sunroof 3 is opened, so that the sunshade 5 is prevented from negative pressures and resulting damages while the vehicle is traveling.

It is to be understood that although the present invention has been described in detail with respect to a preferred embodiment thereof, various other embodiments and variations which fall within the scope and spirit of the invention may occur to those skilled in the art. Any such other embodiments and variations are intended to be covered by the following claims.

What is claimed is:

1. A sliding roof for an automotive vehicle for opening and closing a roof opening formed in a vehicle roof, comprising:
   a light transmitting sliding sunroof slidingly movable between open and closed positions in which said roof opening is fully opened and closed, respectively;
   a light isolating sliding sunshade, disposed beneath said sunroof, slidingly movable between open and closed positions in which said roof opening is fully opened and closed, respectively;
   sunroof drive means for causing said light transmitting sliding sunroof to move between said open and closed positions;
   sunshade drive means for causing said light isolating sliding sunshade to move between said open and closed positions.;
   a manually operated sunroof switch for actuating said sunroof drive means;
   a manually operated sunshade switch for actuating said sunshade drive means; and
   drive control means for activating said sunroof drive means to cause said light transmitting sliding sunroof to open said roof opening only after having driven said light isolating sliding sunshade to its open position when said manually operated sunroof switch is operated to open said roof opening, and for activating said sunshade drive means to cause said light isolating sliding sunshade to close said roof opening only after having driven said light transmitting sliding sunroof to its closed position when said manually operated sunshade switch is operated to close the roof opening.

2. A sliding roof as recited in claim 1, wherein said drive control means comprises time delay means for activating said sunroof drive means with a predetermined time delay after immediately activating said sunshade drive means when said manually operated sunroof switch is operated to open said roof opening and for activating said sunshade drive means with a predetermined time delay after directly activating said sunroof drive means when said manually operated sunshade switch is operated to close the roof opening.

3. A sliding roof as recited in claim 2, wherein said time delay means comprises a first delay circuit connected to said sunroof drive means and a second delay circuit connected to said sunshade drive means.

4. A sliding roof as recited in claim 3, wherein said sunshade drive means and said sunroof drive means each comprises a reversible electric motor.

5. A sliding roof as recited in claim 1, wherein said light isolating sliding sunshade comprises a front half sunshade and a rear half sunshade and link means for releaseably connecting said front half sunshade and said rear half sunshade and making said light isolating sliding sunshade into one flat unit, said link means releasing said front half sunshade from said rear half sunshade when said rear half sunshade is placed in its open position so as to allow said front half sunshade to move above said rear half sunshade and into its open position, said link means reconnecting said front half sunshade and said rear half sunshade into said one flat unit when said front half sunshade is moved from above said rear half sunshade.

6. A sliding roof as recited in claim 5, wherein said link means comprises a bendable link lever secured to said front half sunshade and a link arm secured to said rear half sunshade, said bendable link lever being engaged by said link arm when said front half sunshade is moved from its open position to its closed position and until said rear half sunshade is fully moved to its open position, said bendable link lever further being bent and released from said link arm when said front half sunshade is forced to its open position while said rear half sunshade is in its open position.

7. A sliding roof as recited in claim 6, wherein said link arm is able to be manually shifted in a transverse direction of said vehicle to disengage said link lever therefrom, thereby allowing said rear half sunshade to be manually moved between its open and closed positions.

* * * * *